US012592177B2

(12) United States Patent
Chou et al.

(10) Patent No.: US 12,592,177 B2
(45) Date of Patent: Mar. 31, 2026

(54) FOVEATED DISPLAY BURN-IN STATISTICS AND BURN-IN COMPENSATION SYSTEMS AND METHODS

(71) Applicant: Apple Inc., Cupertino, CA (US)

(72) Inventors: Jim C Chou, San Jose, CA (US); Shereef Shehata, San Ramon, CA (US); Yung-Chin Chen, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/629,584

(22) Filed: Apr. 8, 2024

(65) Prior Publication Data

US 2024/0257710 A1 Aug. 1, 2024

Related U.S. Application Data

(63) Continuation of application No. 17/933,776, filed on Sep. 20, 2022, now Pat. No. 11,955,054.

(51) Int. Cl.
*G09G 3/20* (2006.01)

(52) U.S. Cl.
CPC ... *G09G 3/2096* (2013.01); *G09G 2320/0233* (2013.01); *G09G 2320/043* (2013.01); (Continued)

(58) Field of Classification Search
CPC ........... G09G 3/2096; G09G 2320/043; G09G 2320/046; G09G 2320/0626; G09G 2320/0407; G09G 2354/00; G09G 2320/0233; G09G 2320/048; G09G 2320/041; G09G 2340/0407; G09G 2330/10; G06F 3/04845; H04N 23/631; H04N 5/272
See application file for complete search history.

(56) References Cited

U.S. PATENT DOCUMENTS 10,593,247 B2 3/2020 Zhaung et al.
10,885,883 B2 1/2021 Knez et al.
(Continued)

OTHER PUBLICATIONS

International Search Report and Written Opinion for PCT Application No. PCT/US2023/033087 dated Sep. 18, 2023; 12 pgs.

*Primary Examiner* — Sujit Shah
(74) *Attorney, Agent, or Firm* — Fletcher Yoder, P.C.

(57) ABSTRACT

A device may include a display that display an image frame that is divided into adjustable regions having respective resolutions based on compensated image data. The device may also include image processing circuitry to generate the compensated image data by applying gains that compensate for burn-in related aging of pixels of the display. The gains are based on an aggregation of history updates indicative of estimated amounts of aging associated with pixel utilization. The circuitry may generate a history update by obtaining boundary data indicative of the boundaries between the adjustable regions, determining an estimated amount of aging, and dynamically resampling the estimated amount of aging by resampling a portion of the estimated amount of aging corresponding to an adjustable region by a factor and resampling of a different portion of the estimated amount of aging corresponding to another adjustable region by a different factor based on the boundary data.

19 Claims, 13 Drawing Sheets

(52) U.S. Cl.
CPC ................. *G09G 2320/046* (2013.01); *G09G 2320/0626* (2013.01); *G09G 2340/0407* (2013.01); *G09G 2354/00* (2013.01)

(56) References Cited

U.S. PATENT DOCUMENTS

| | | | | |
|---|---|---|---|---|
| 10,963,998 | B1 | 3/2021 | Baar et al. | |
| 11,275,482 | B2 | 3/2022 | Osterhout et al. | |
| 11,735,147 | B1 | 8/2023 | Chou et al. | |
| 2017/0213493 | A1 | 7/2017 | Han | |
| 2019/0206315 | A1* | 7/2019 | Park ..................... | G09G 3/3233 |
| 2021/0027751 | A1 | 1/2021 | Tang et al. | |
| 2021/0096644 | A1 | 4/2021 | Wang et al. | |
| 2021/0098520 | A1 | 4/2021 | Cai et al. | |
| 2021/0098535 | A1* | 4/2021 | Cai ...................... | G09G 3/2003 |
| 2021/0183333 | A1* | 6/2021 | Holland ............... | G09G 3/3208 |
| 2021/0183334 | A1* | 6/2021 | Holland ................. | G09G 5/001 |
| 2021/0341741 | A1 | 11/2021 | Kim et al. | |
| 2021/0366082 | A1 | 11/2021 | Xiao et al. | |
| 2022/0028355 | A1 | 1/2022 | Chun et al. | |
| 2022/0157234 | A1 | 5/2022 | Kim et al. | |
| 2022/0223104 | A1 | 7/2022 | Sun et al. | |
| 2022/0254297 | A1 | 8/2022 | Gao et al. | |
| 2022/0269340 | A1 | 8/2022 | Hirvonen et al. | |

* cited by examiner

FOVEATED DISPLAY BURN-IN STATISTICS AND BURN-IN COMPENSATION SYSTEMS AND METHODS

CROSS REFERENCE TO RELATED APPLICATIONS

This application is a Continuation of and claims priority to U.S. patent application Ser. No. 17/933,776, filed Sep. 20, 2022, and entitled "FOVEATED DISPLAY BURN-IN STATISTICS AND BURN-IN COMPENSATION SYSTEMS AND METHODS", which is incorporated herein by reference in its entirety for all purposes.

BACKGROUND

This disclosure relates to image data processing to identify and compensate for burn-in on a foveated electronic display.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Numerous electronic devices—including televisions, portable phones, computers, wearable devices, vehicle dashboards, virtual-reality glasses, and more—display images on an electronic display. To display an image, an electronic display may control light emission of its display pixels based at least in part on corresponding image data. As electronic displays gain increasingly higher resolutions and dynamic ranges, they may also become increasingly more susceptible to image artifacts, such as burn-in related aging of pixels, that may be compensated by image processing.

Burn-in is a phenomenon whereby pixels degrade over time owing to the different amount of light that different pixels emit over time. In other words, pixels may age at different rates depending on their relative utilization and/or environment. For example, pixels used more than others may age more quickly, and thus may gradually emit less light when given the same amount of driving current or voltage values. This may produce undesirable burn-in image artifacts on the electronic display. In general, the estimated aging due to pixels' utilization may be stored, accumulated, and referenced when compensating for burn-in effects. However, when operating in multiple resolutions, such as for a foveated display that displays multiple different resolutions of an image at different locations on the electronic display depending on a viewer's gaze or focal point on the display, tracking burn-in according to prior techniques may result in mura image artifacts.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to identifying and/or compensating for non-uniform burn-in/aging artifacts on electronic displays with variable resolutions, such as foveated displays. Burn-in related aging may vary across an electronic display based on individual or grouped pixel usage such as the frequency, luminance output, and/or environment (e.g., temperature) of the pixels. As a result, some pixels may gradually emit less light when given the same driving current or voltage values, effectively becoming darker than the other pixels when given a signal for the same brightness level. As such, image processing circuitry and/or software may monitor and/or model the amount of burn-in that is likely to have occurred in the different pixels and adjust image data values accordingly before such signals are sent to the electronic display to reduce or eliminate the appearance of burn-in artifacts on the electronic display.

For variable resolution displays, such as foveated displays, the image data is be arranged such that different portions of the display have different content resolutions (e.g., based on a focal point of a viewer's gaze). As such, adjustable (e.g., based on the focal point) regions of different size pixel groupings are established for each image frame identifying the content resolution for different portions of the electronic display. Furthermore, boundary data indicative of the boundaries between the adjustable regions or otherwise demarcating the changes in content resolution may be used to perform burn-in statistics (BIS) collection and burn-in compensation (BIC).

BIS collection is used to generate history updates indicative of the amount of aging expected to occur due to the luminance output and/or environment (e.g., temperature) of the display pixels for an image frame. Luminance based aging may be determined based on the gray levels (e.g., pixel values of image data) applied to the pixels, an emission duty cycle, a global brightness setting of the display, and/or the average pixel luminance (e.g., average brightness) of the display. Temperature based aging may depend on temperatures derived from a temperature grid coinciding with the display panel. The boundary data is used to select pixel locations (corresponding to pixel groupings) for the temperatures to be determined to estimate the temperature based aging. The luminance and temperature based aging are combined and the estimated amount of aging is dynamically resampled from the multi-resolution format to a static format to generate a history update. History updates are aggregated to maintain a burn-in history map.

By keeping track of the estimated amount of burn-in that has taken place in the electronic display, burn-in gain maps may be derived from the burn-in history map to compensate for the burn-in effects. The burn-in gain maps may gain down image data that will be sent to the less-aged pixels (which would otherwise be brighter) without gaining down, gaining down less, or up gaining the image data that will be sent to the pixels with the greatest amount of aging (which would otherwise be darker). In this way, the pixels of the electronic display that are likely to exhibit the greatest amount of aging will appear to be equally as bright as pixels with less aging. As such, perceivable burn-in artifacts on the electronic display may be reduced or eliminated.

In some embodiments, the gain maps may be generated in a downsampled format (the same as or different from the burn-in history map) relative to the pixel resolution of the electronic display such as to save memory and/or reduce computation time. As such, the gain maps may be dynamically resampled to generate a multi-resolution gain map. For example, if a gain map is generated that is downsampled by a factor of two in both the vertical and horizontal directions (relative to the pixel resolution of the electronic display) and the electronic display is divided into regions having content grouped pixels of 1×1, 2×2, and 4×4, the gain map may be upsampled to compensate 1×1 grouped pixels (e.g., individual pixels), downsampled to compensate 4×4 grouped pixels, and used natively for 2×2 grouped pixels. Furthermore, different upsamplings and downsamplings may occur in different directions (e.g., vertically and horizontally) depending on the adjustable regions defined by the boundary data.

The multi-resolution gain maps may be used with one or more gain parameters to apply gains to input pixel values to generate compensated pixel vales. In this way, the pixels of the electronic display that have suffered the greatest amount of aging will appear to be equally as bright as the pixels that have suffered the least amount of aging. Moreover, by manipulating the upsampling, downsampling, and communication of pixel data, gain maps, and history updates, the image processing circuitry is able to efficiently compensate for burn-in related aging while displaying an image frame at multiple different content resolutions across an electronic display.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
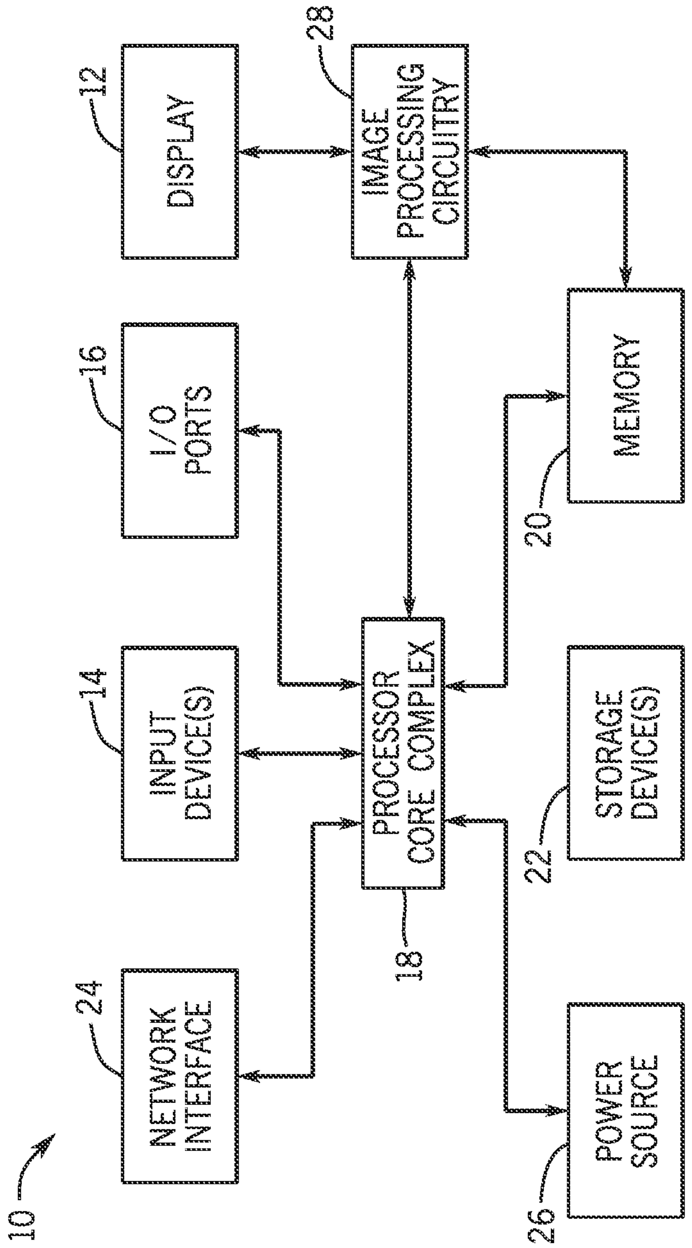
FIG. 1 is a schematic diagram of an electronic device that includes an electronic display, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use electronic displays to present visual information. Such electronic devices may include computers, mobile phones, portable media devices, tablets, televisions, virtual-reality headsets, and vehicle dashboards, among many others. To display an image, an electronic display controls the luminance (and, as a consequence, the color) of its display pixels based on corresponding image data received at a particular resolution. For example, an image data source may provide image data as a stream of pixel data, in which data for each pixel indicates a target luminance (e.g., brightness and/or color) of one or more display pixels located at corresponding pixel positions. In some embodiments, image data may indicate luminance per color component, for example, via red component image data, blue component image data, and green component image data, collectively referred to as RGB image data (e.g., RGB, sRGB). Additionally or alternatively, image data may be indicated by a luma channel and one or more chrominance channels (e.g., YCbCr, YUV, etc.), grayscale (e.g., gray level), or other color basis. It should be appreciated that a luma channel, as disclosed herein, may encompass linear, non-linear, and/or gamma-corrected luminance values.

Additionally, the image data may be processed to account for one or more physical or digital effects associated with displaying the image data. For example, burn-in/aging of display pixels may be estimated based on the frequency, luminance output, and/or environment (e.g., temperature) of the display pixels. In general, by keeping track of the estimated amount of burn-in that has taken place in the electronic display, burn-in gain maps may be derived to compensate for the burn-in effects. The burn-in gain maps may gain down image data that will be sent to the less-aged pixels (which would otherwise be brighter) without gaining down, or by gaining down less, the image data that will be sent to the pixels with the greatest amount of aging (which would otherwise be darker). In this way, the pixels of the electronic display that are likely to exhibit the greatest amount of aging will appear to be equally as bright as pixels with less aging. Additionally or alternatively, pixels with the higher amounts of estimated burn-in may be gained up to compensate for their reduced luminance output depending on the capabilities of the pixel relative to the desired luminance levels. As such, perceivable burn-in artifacts on the electronic display may be reduced or eliminated.

To generate the gain maps (e.g., a gain map for each color component) for burn-in compensation (BIC), image processing circuitry, such as a BIC/burn-in statistics (BIS) block, may utilize one or more display and/or environmental factors to maintain a burn-in history map based on pixel utilization. For example, a history update may include an estimated amount of aging that occurs due to the pixel utilizations for an image frame, and the history updates may be applied to the burn-in history map such that, in the aggregate, the history updates maintain a cumulative estimated aging of the pixels of the electronic display. Furthermore, in some embodiments, different color component pixels (e.g., red pixels, green pixels, and blue pixels) may have separate history updates, burn-in maps, and gain maps based thereon. To generate the history update, the image processing circuitry may utilize factors such as the image data (e.g., pixel gray levels), an emission duty cycle, a global bright setting, an average pixel luminance over the image frame, and/or environmental factors such as the temperature of the pixels.

Additionally, in some embodiments, the gain maps may be generated in a downsampled format relative to the pixel resolution (e.g., number of pixels/pixel density) of the electronic display such as to save memory and/or reduce computation time. Furthermore, for electronic displays that may display content in multiple resolutions, such as a foveated display, navigating between the multiple resolutions of image data, the gain maps, and the pixel resolution of the electronic display may lead to conversions between multiple different resolution spaces for generating history updates and/or compensating image data based on the history updates. For example, if a gain map is generated that is downsampled by a factor of two in both the vertical and horizontal directions (relative to the pixel resolution of the electronic display) and the electronic display is divided into regions having content grouped pixels of 1×1, 2×2, and 4×4, the gain map may be upsampled to compensate 1×1 grouped pixels (e.g., individual pixels), downsampled further to compensate 4×4 grouped pixels, and used natively for 2×2 grouped pixels. As should be appreciated, while discussed herein as utilizing a downsampled gain map, a native resolution gain map may also be used utilizing the disclosed techniques. Moreover, as used herein, content resolution may be indicative of the number of pixels grouped together that receive the same image data associated with a single pixel location, and may change from image frame to image frame, as well as be different across a single image frame. Further, the pixel resolution may represent the number of pixels on the electronic display for displaying the image frame. For example, a content resolution having 2×2 grouped pixels may be one fourth the pixel resolution. By manipulating the upsampling, downsampling, and communication of pixel data, gain maps, and history updates, the image processing circuitry is able to efficiently compensate for burn-in related aging while displaying an image frame at multiple different content resolutions across an electronic display.

With the foregoing in mind, FIG. 1 is an example electronic device 10 with an electronic display 12 having independently controlled color component illuminators (e.g., projectors, backlights, etc.). As described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Moreover, the image processing circuitry 28 (e.g., a graphics processing unit, a display image processing pipeline, etc.) may be included in the processor core complex 18 or be implemented separately.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

The electronic display 12 may display a graphical user interface (GUI) (e.g., of an operating system or computer program), an application interface, text, a still image, and/or video content. The electronic display 12 may include a display panel with one or more display pixels to facilitate displaying images. Additionally, each display pixel may represent one of the sub-pixels that control the luminance of a color component (e.g., red, green, or blue). As used herein, a display pixel may refer to a collection of sub-pixels (e.g., red, green, and blue subpixels) or may refer to a single sub-pixel.

As described above, the electronic display 12 may display an image by controlling the luminance output (e.g., light emission) of the sub-pixels based on corresponding image data. In some embodiments, pixel or image data may be generated by an image source, such as the processor core complex 18, a graphics processing unit (GPU), or an image sensor (e.g., camera). Additionally, in some embodiments, image data may be received from another electronic device 10, for example, via the network interface 24 and/or an I/O port 16. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
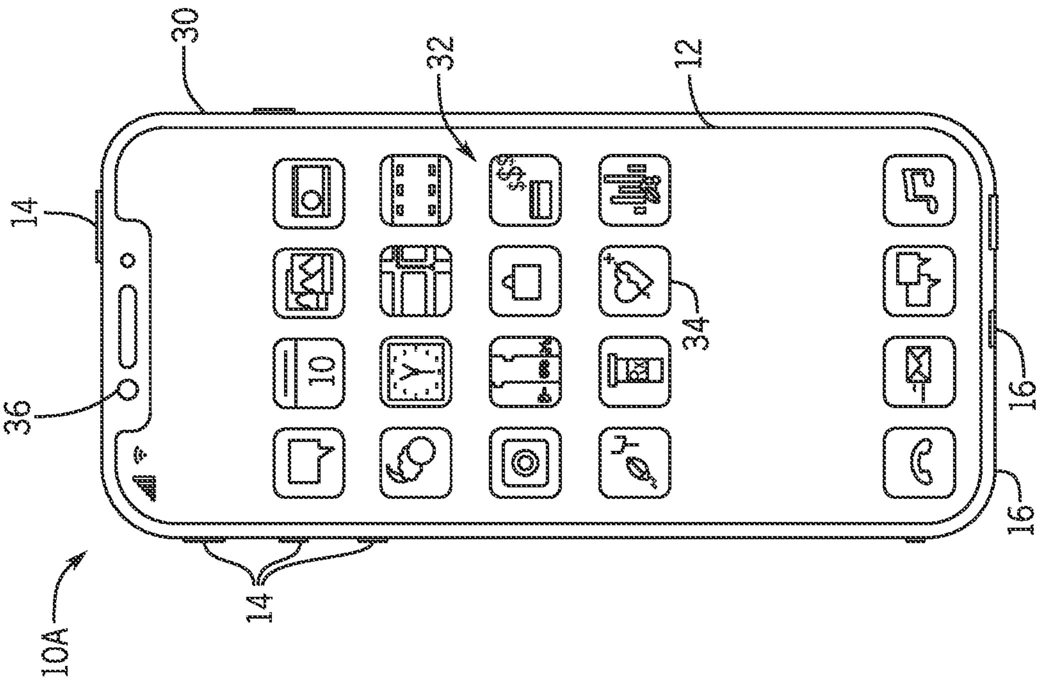
FIG. 2 is an example of the electronic device of FIG. 1 in the form of a handheld device, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smartphone, such as an IPHONE® model available from Apple Inc.

The handheld device 10A may include an enclosure 30 (e.g., housing) to, for example, protect interior components from physical damage and/or shield them from electromagnetic interference. The enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Input devices 14 may be accessed through openings in the enclosure 30. Moreover, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
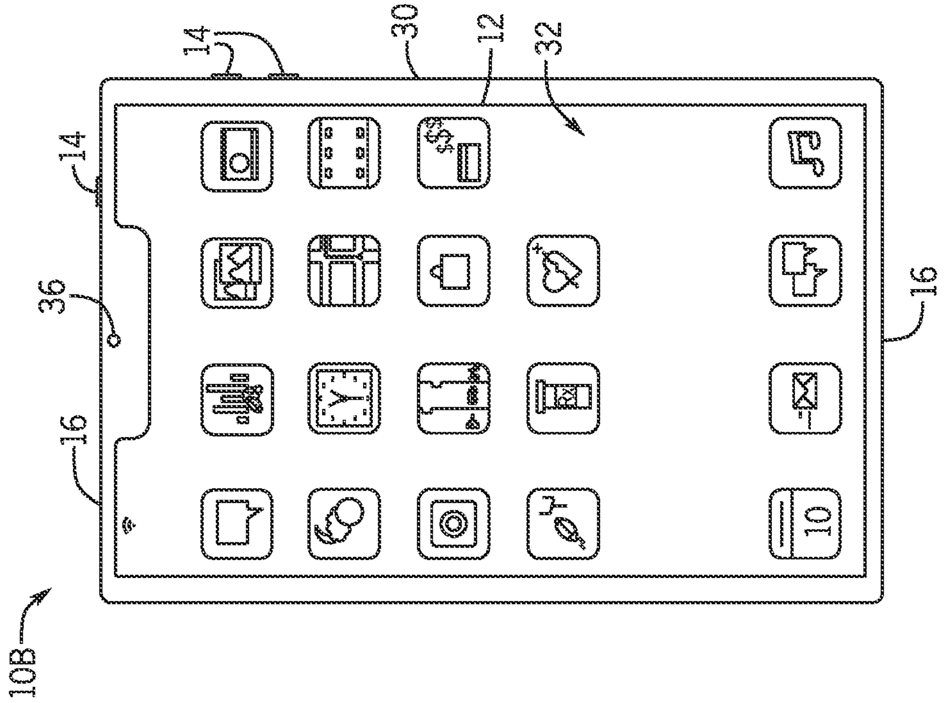
FIG. 3 is another example of the electronic device of FIG. 1 in the form of a tablet device, in accordance with an embodiment.
Figure 4:
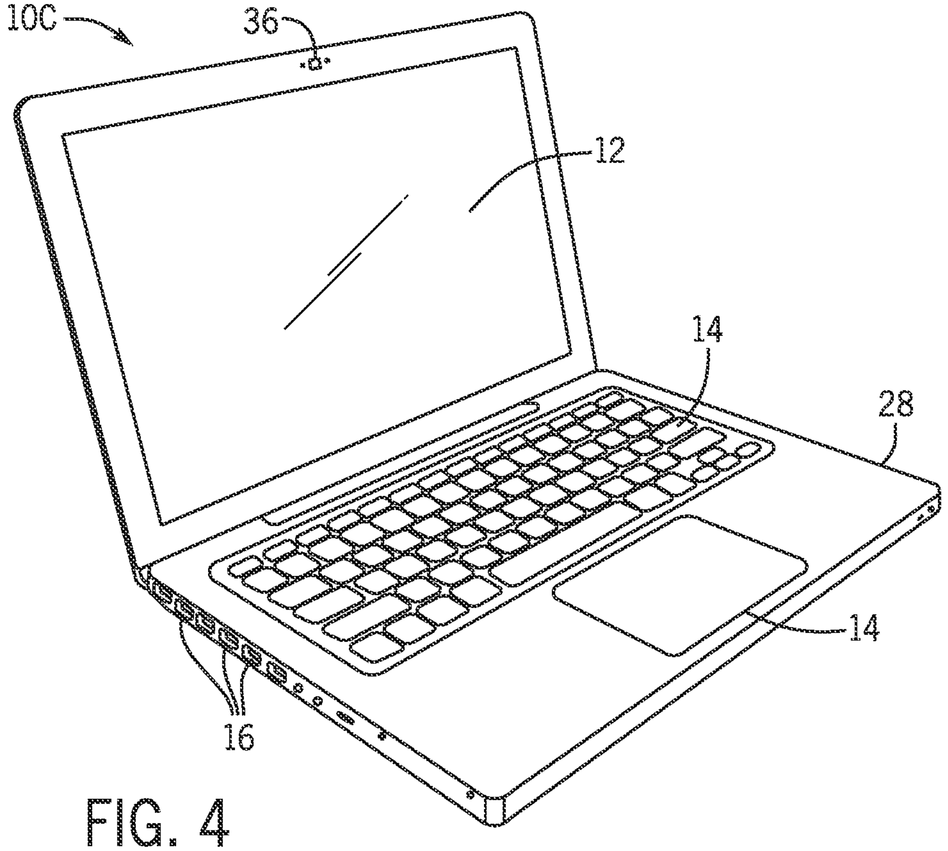
FIG. 4 is another example of the electronic device of FIG. 1 in the form of a computer, in accordance with an embodiment.
Figure 5:
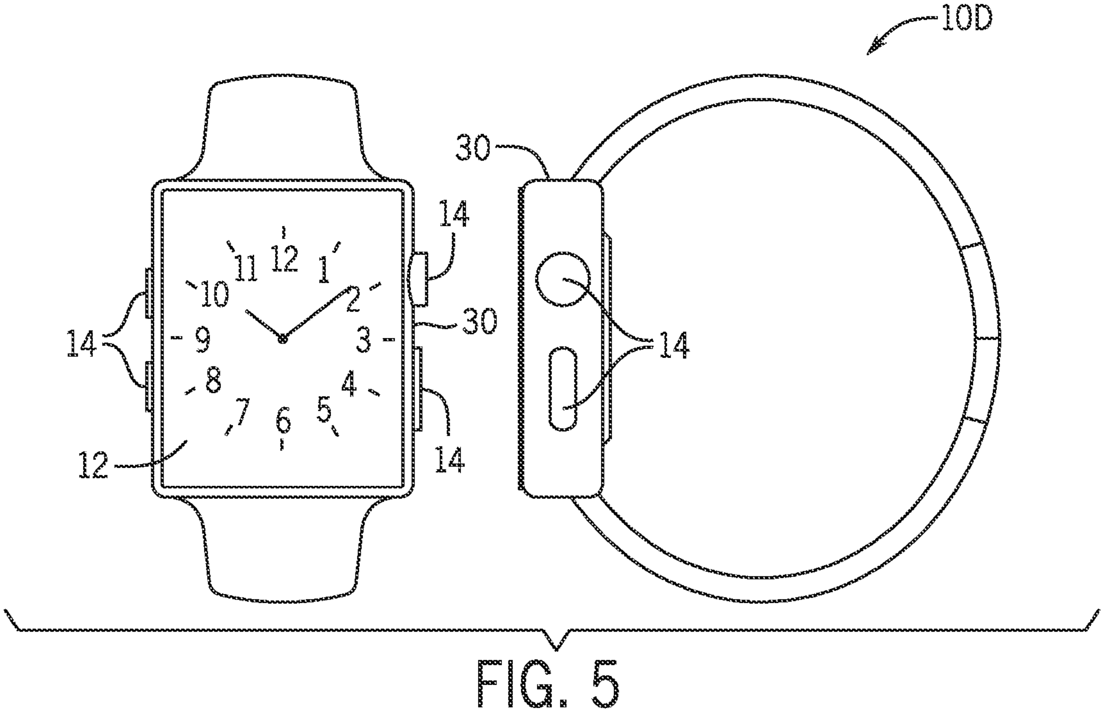
FIG. 5 is another example of the electronic device of FIG. 1 in the form of a watch, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
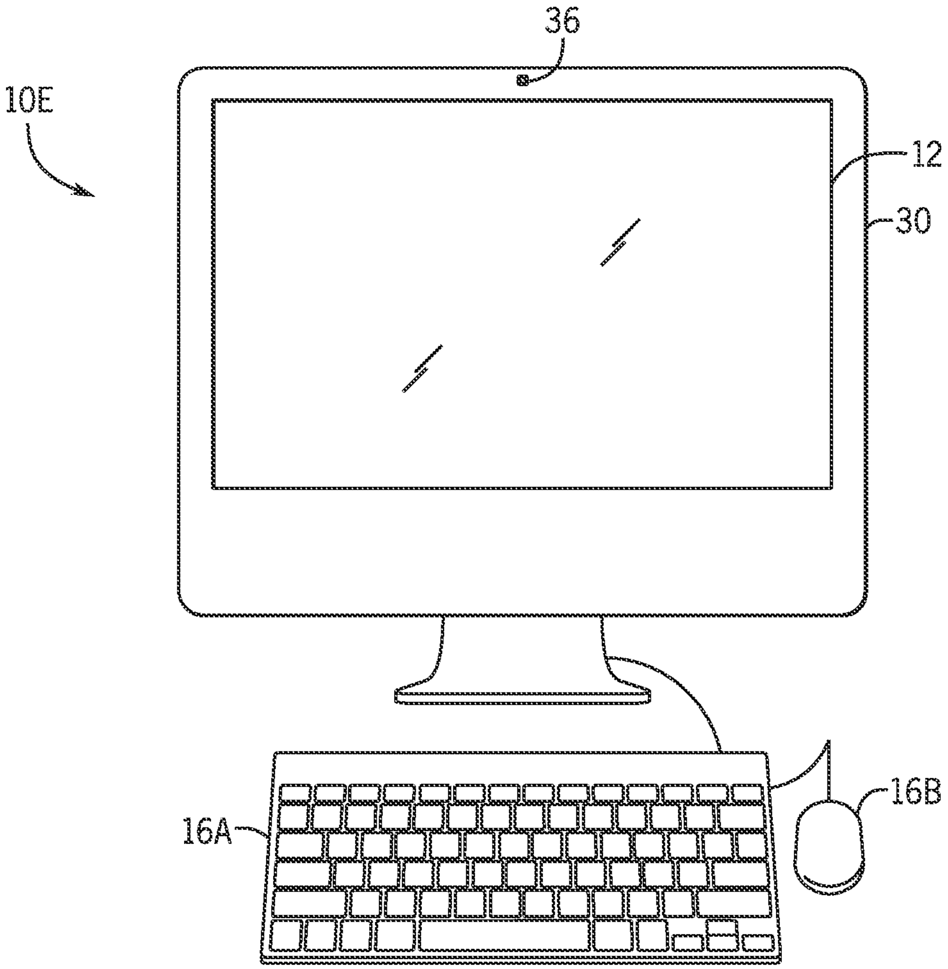
FIG. 6 is another example of the electronic device of FIG. 1 in the form of a computer, in accordance with an embodiment.

Turning to FIG. 6, a computer 10E may represent another embodiment of the electronic device 10 of FIG. 1. The computer 10E may be any suitable computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 30 may be provided to protect and enclose internal components of the computer 10E, such as the electronic display 12. In certain embodiments, a user of the computer 10E may interact with the computer 10E using various peripheral input devices 14, such as a keyboard 14A or mouse 14B, which may connect to the computer 10E.

As described above, the electronic display 12 may display images based at least in part on image data. Before being used to display a corresponding image on the electronic display 12, the image data may be processed, for example, via the image processing circuitry 28. In general, the image processing circuitry 28 may process the image data for display on one or more electronic displays 12. For example, the image processing circuitry 28 may include a display pipeline, memory-to-memory scaler and rotator (MSR) circuitry, warp compensation circuitry, or additional hardware or software means for processing image data. The image data may be processed by the image processing circuitry 28 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry.

Figure 7:
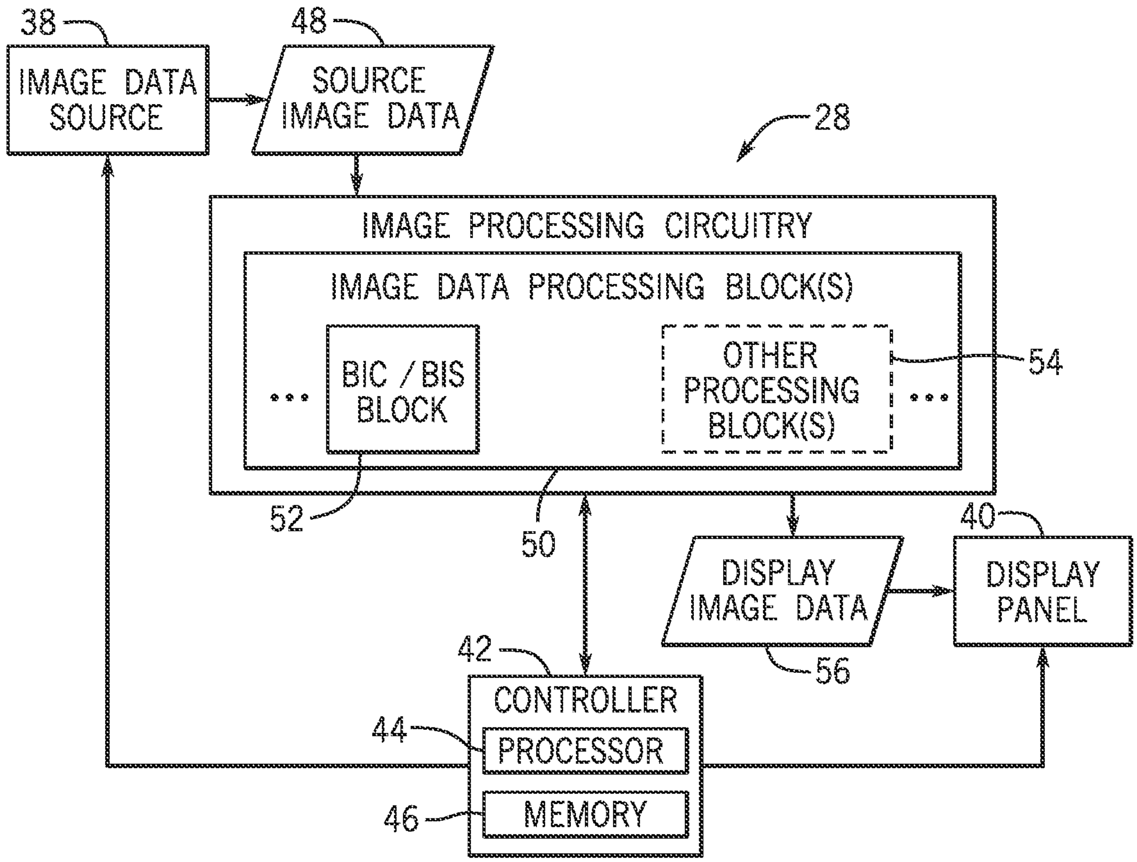
FIG. 7 is a schematic diagram of the image processing circuitry of FIG. 1 including a burn-in compensation (BIC)/burn-in statistics (BIS) block, in accordance with an embodiment.

To help illustrate, a portion of the electronic device 10, including image processing circuitry 28, is shown in FIG. 7. The image processing circuitry 28 may be implemented in the electronic device 10, in the electronic display 12, or a combination thereof. For example, the image processing circuitry 28 may be included in the processor core complex 18, a timing controller (TCON) in the electronic display 12, or any combination thereof. As should be appreciated, although image processing is discussed herein as being performed via a number of image data processing blocks, embodiments may include hardware or software components to carry out the techniques discussed herein.

The electronic device 10 may also include an image data source 38, a display panel 40, and/or a controller 42 in communication with the image processing circuitry 28. In some embodiments, the display panel 40 of the electronic display 12 may be a reflective technology display, a liquid crystal display (LCD), or any other suitable type of display panel 40. In some embodiments, the controller 42 may control operation of the image processing circuitry 28, the image data source 38, and/or the display panel 40. To facilitate controlling operation, the controller 42 may include a controller processor 44 and/or controller memory 46. In some embodiments, the controller processor 44 may be included in the processor core complex 18, the image processing circuitry 28, a timing controller in the electronic display 12, a separate processing module, or any combination thereof and execute instructions stored in the controller memory 46. Additionally, in some embodiments, the controller memory 46 may be included in the local memory 20, the main memory storage device 22, a separate tangible, non-transitory, computer-readable medium, or any combination thereof.

The image processing circuitry 28 may receive source image data 48 corresponding to a desired image to be displayed on the electronic display 12 from the image data source 38. The source image data 48 may indicate target characteristics (e.g., pixel data) corresponding to the desired image using any suitable source format, such as an RGB format, an aRGB format, a YCbCr format, and/or the like. Moreover, the source image data may be fixed or floating point and be of any suitable bit-depth. Furthermore, the source image data 48 may reside in a linear color space, a gamma-corrected color space, or any other suitable color space. As used herein, pixels or pixel data may refer to a grouping of sub-pixels (e.g., individual color component pixels such as red, green, and blue) or the sub-pixels themselves.

As described above, the image processing circuitry 28 may operate to process source image data 48 received from the image data source 38. The image data source 38 may include captured images (e.g., from one or more cameras 36), images stored in memory, graphics generated by the processor core complex 18, or a combination thereof. Additionally, the image processing circuitry 28 may include one or more image data processing blocks 50 (e.g., circuitry, modules, or processing stages) such as a burn-in compensation (BIC)/burn-in statistics (BIS) block 52. As should be appreciated, multiple other processing blocks 54 may also be incorporated into the image processing circuitry 28, such as a pixel contrast control (PCC) block, color management block, a dither block, a blend block, a warp block, a scaling/rotation block, etc. before and/or after the BIC/BIS block 52. The image data processing blocks 50 may receive and process source image data 48 and output display image data 56 in a format (e.g., digital format, image space, and/or resolution) interpretable by the display panel 40. Further, the functions (e.g., operations) performed by the image processing circuitry 28 may be divided between various image data processing blocks 50, and, while the term “block” is used herein, there may or may not be a logical or physical separation between the image data processing blocks 50. After processing, the image processing circuitry 28 may output the display image data 56 to the display panel 40. Based at least in part on the display image data 56, the display panel 40 may apply analog electrical signals to the display pixels of the electronic display 12 to illuminate the pixels at a desired luminance level and display a corresponding image.

Figure 8:
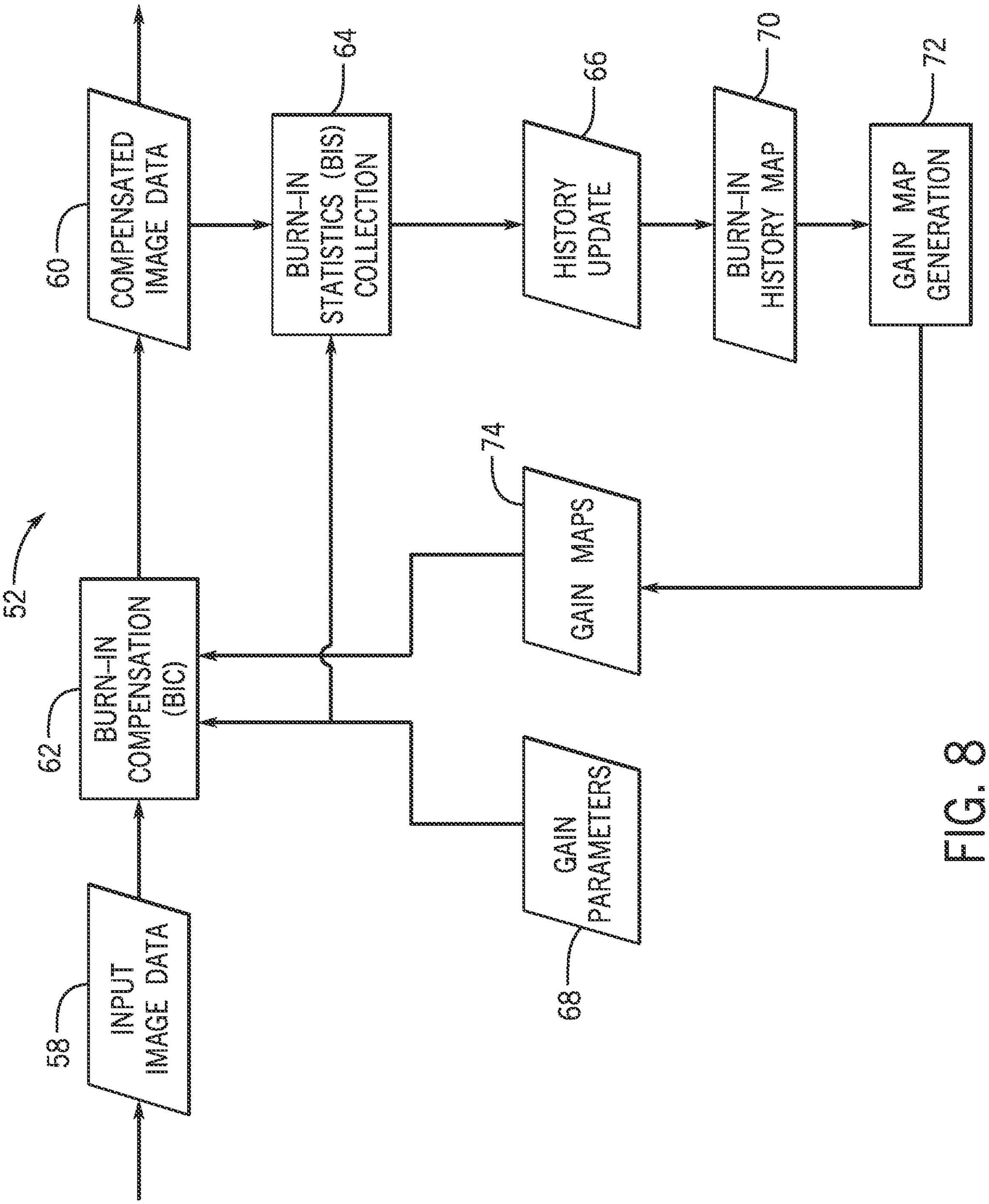
FIG. 8 is a schematic diagram of the BIC/BIS block of FIG. 7 including BIC and BIS collection, in accordance with an embodiment.

The BIC/BIS block 52 collects statistics about the degree to which burn-in is expected to have occurred on the electronic display 12 and compensates for burn-in related aging of display pixels to reduce or eliminate the visual effects of burn-in. As such, the BIC/BIS block 52 may receive input image data 58 (e.g., pixel values) and generate compensated image data 60 by performing BIC 62, as shown in the schematic diagram of the BIC/BIS block 52 of FIG. 8. Further, based on the compensated image data 60, which may more closely resemble the pixel utilizations than the input image data 58, BIS collection 64 may be performed to generate a burn-in history update 66. The history update 66 is an incremental update representing an increased amount of pixel aging that is estimated to have occurred since a corresponding previous history update 66. As should be appreciated, history updates 66 may be performed for each image frame, sub-sampled at a desired frequency (e.g., every other image frame, every third image frame, every fourth image frame, and so on), and/or the pixels may be divided into groups such that each group of pixels is sampled over a different image frame. In some embodiments, gain parameters 68 such as a normalization factor, a brightness adaptation factor, a duty cycle, and/or a global brightness setting, may be used in generating the history update 66 to determine or otherwise calculate the estimated amount of pixel aging. Furthermore, each history update 66 may be aggregated to maintain a burn-in history map 70 indicative of the total estimated burn-in that has occurred to the display pixels of the electronic display 12.

Gain map generation 72 may produce gain maps 74 of per-color-component pixel gains based on the burn-in history map 70. For example, a gain map 74 may be a two-dimensional (2D) map for a single color component that maps an input pixel value to a compensated pixel value. In some embodiments, the gain maps 74 may be programmed into 2D lookup tables (LUTs) for efficient use during BIC 62. Using the gain maps 74 and one or more gain parameters 68, BIC 62 may be performed on a subsequent set of input image data 58. The gain parameters 68 may augment the gain maps 74 during BIC 62 to account for global and/or average display characteristics for the image frame. For example, the gain parameters 68 may include a normalization factor and a brightness adaptation factor, which may vary depending on the global display brightness, the gray level of the input image data 58, the emission duty cycle of the pixels, and/or which color component (e.g., red, green, or blue) the gain parameters 68 is applied, as discussed further below. As should be appreciated, the gain parameters 68 discussed herein are non-limiting, and additional parameters may also be included in determining the compensated image data 60 such as floating or fixed reference values and/or parameters representative of the type of display panel 40. As such, the gain parameters 68 may represent any suitable parameters that the BIC/BIS block 52 may use to appropriately adjust the values of and/or apply the gain maps 74 to compensate for burn-in.

During BIC 62 and/or BIS collection 64 the data used therein may include input image data 58, compensated image data 60, gain maps 74, as well as other information (e.g., temperature information) that may vary in resolution. In particular, when used in conjunction with foveation, different portions of the image data may include different content resolutions. As such, analysis and computation of burn-in related data may vary based on the sizes and locations of the different content resolutions.

Figure 9:
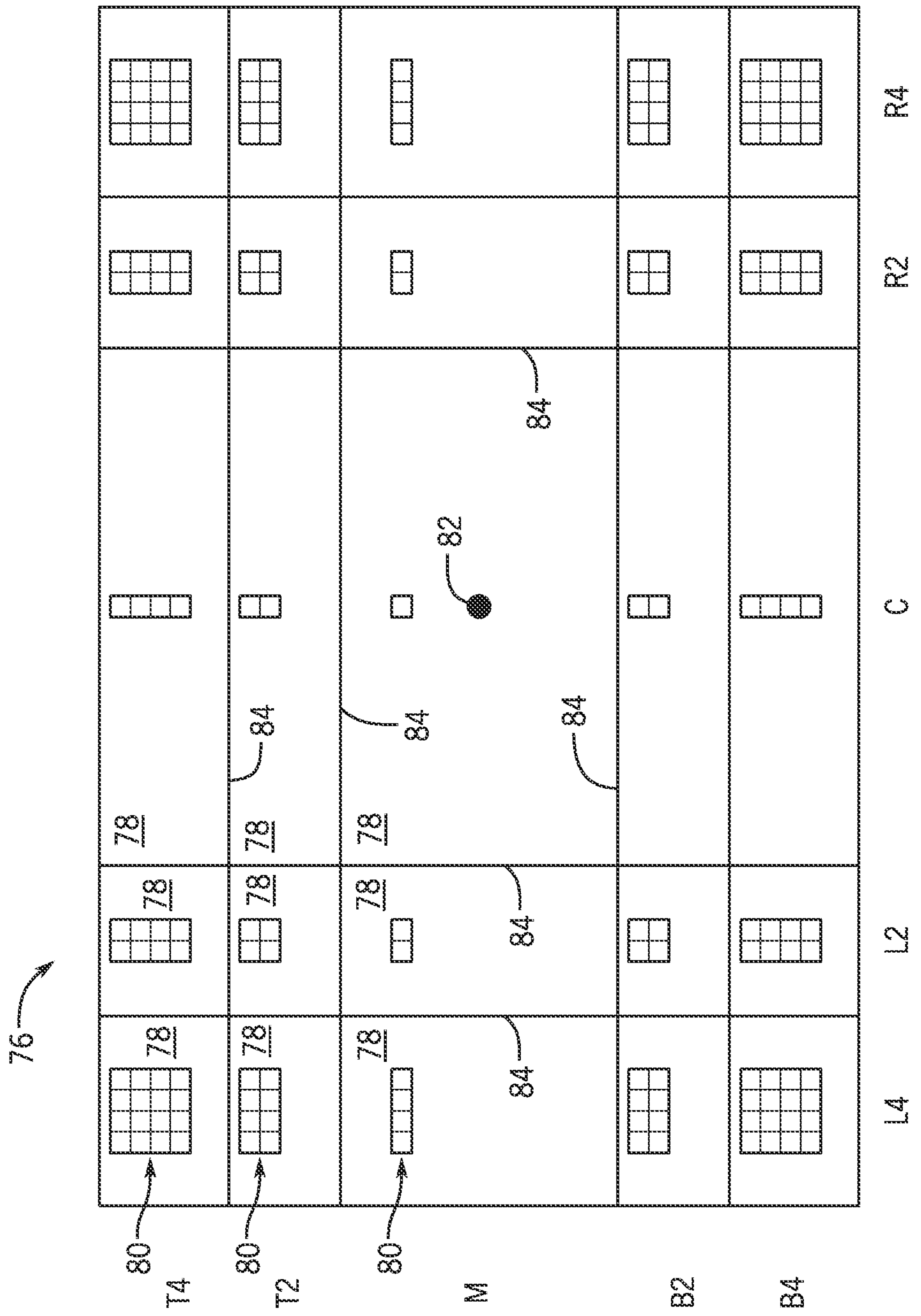
FIG. 9 is an example layout of multiple adjustable regions of pixel groupings of a foveated display, in accordance with an embodiment.

FIG. 9 is a foveated display 76 split into multiple adjustable regions 78 of pixel groupings 80. In general, a foveated display 76 has a variable content resolution across the display panel 40 such that different portions of the display panel 40 are displayed at different resolutions depending on a focal point 82 (e.g., center of the viewer's gaze) of the user's gaze (e.g., determined by eye-tracking). By reducing the content resolution in certain portions of the display panel 40, image processing time and/or resource utilization may be reduced. While the human eye may have its best acuity at the focal point 82, further from the focal point 82, a viewer may not be able to distinguish between high and low resolutions. As such, higher content resolutions may be utilized in regions of the foveated display 76 near the focal point 82, while lesser content resolutions may be utilized further from the focal point 82. For example, if a viewer's focal point 82 is at the center of the foveated display 76, the portion of the foveated display 76 at the center may be set to have the highest content resolution (e.g., with 1×1 pixel grouping 80), and portions of the foveated display 76 further from the focal point 82 may have lower content resolutions with larger pixel groupings 80. In the example of FIG. 9, the focal point 82 is in the center of the foveated display 76 giving symmetrical adjustable regions 78. However, depending on the location of the focal point 82, the location of the boundaries 84 and the size of the adjustable regions 78 may vary.

In the depicted example, the foveated display 76 is divided into a set of 5×5 adjustable regions 78 according to their associated pixel groupings 80. In other words, five columns (e.g., L4, L2, C, R2, and R4) and five rows (e.g., T4, T2, M, B2, and B4) may define the adjustable regions 78. The center middle (C, M) adjustable region coincides with the focal point 82 of the viewer's gaze and may utilize the native resolution of the display panel 40 (e.g., 1×1 pixel grouping 80). Adjustable regions 78 in columns to the right of center (C), such as R2 and R4, have a reduced content resolution in the horizontal direction by a factor of two and four, respectively. Similarly, adjustable regions 78 in columns to the left of center, such as L2 and L4, have a reduced content resolution in the horizontal direction by a factor of two and four, respectively. Moreover, rows on top of the middle (M), such as T2 and T4, have a reduced content resolution in the vertical direction by a factor of two and four, respectively. Similarly, rows below the middle (M), such as B2 and B4, have a reduced content resolution in the vertical direction by a factor of two and four, respectively. As such, depending on the adjustable region 78, the content resolution may vary horizontally and/or vertically.

The pixel groupings 80 may be indicative of the set of display pixels that utilize the same image data in the reduced content resolutions. For example, while the adjustable region 78 at the focal point 82 may be populated by 1×1 pixel groupings 80, the adjustable region 78 in column L4 and row M may be populated by 4×1 pixel groupings 80 such that individual pixel values, processed as corresponding to individual pixel locations in the reduced content resolution, are each sent to sets of four horizontal pixels of the display panel 40. Similarly, the adjustable region 78 in column L4 and row T4 may be populated by 4×4 pixel groupings 80 such that pixel values are updated sixteen pixels at a time. As should be appreciated, while discussed herein as having reduced content resolutions by factors of two and four, any suitable content resolution or pixel groupings 80 may be used depending on implementation. Furthermore, while discussed herein as utilizing a 5×5 set of adjustable regions 78, any number of columns and rows may be utilized with additional or fewer content resolutions depending on implementation.

As the focal point 82 moves the boundaries 84 of the adjustable regions 78, and the sizes thereof, may also move. For example, if the focal point 82 were to be on the far upper right of the foveated display 76, the center middle (C, M) adjustable region 78, coinciding with the focal point 82, may be set to the far upper right of the foveated display 76. In such a scenario, the T2 and T4 rows and the R2 and R4 columns may have heights and widths of zero, respectively, and the remaining rows and columns may be expanded to encompass the foveated display 76. As such, the boundaries 84 of the adjustable regions 78 may be adjusted based on the focal point 82 to define the pixel groupings 80 for different portions of the foveated display 76.

As discussed herein, the pixel groupings 80 are blocks of pixels that receive the same image data as if the block of pixels was a single pixel in the reduced content resolution of the associated adjustable region 78. To track the pixel groupings 80, an anchor pixel may be assigned for each pixel grouping 80 to denote a single pixel location that corresponds to the pixel grouping 80. For example, the anchor pixel may be the top left pixel in each pixel grouping. The anchor pixels of adjacent pixel groupings 80 within the same adjustable region 78 may be separated by the size of the pixel groupings 80 in the appropriate direction. Furthermore, in some scenarios, pixel groupings 80 may cross one or more boundaries 84. For example, an anchor pixel may be in one adjustable region 78, but the remaining pixels of the pixel grouping 80 may extend into another adjustable region 78. As such, in some embodiments, an offset may be set for each column and/or row to define a starting position for anchor pixels of the pixel groupings 80 of the associated adjustable region 78 relative to the boundary 84 that marks the beginning (e.g., left or top side) of the adjustable region 78. For example, anchor pixels on a boundary 84 may have an offset of zero, while anchor pixels that are one pixel removed from the starting boundary 84 of the adjustable region 78 may have an offset of one. As should be appreciated, while the top left pixel is used herein as an anchor pixel and the top and left boundaries 84 are defined as the starting boundaries (e.g., in accordance with raster scan), any pixel location of the pixel grouping 80 may be used as the representative pixel location and any suitable directions may be used for boundaries 84, depending on implementation (e.g., read order).

Burn-In Statistics (BIS) Collection

Figure 10:
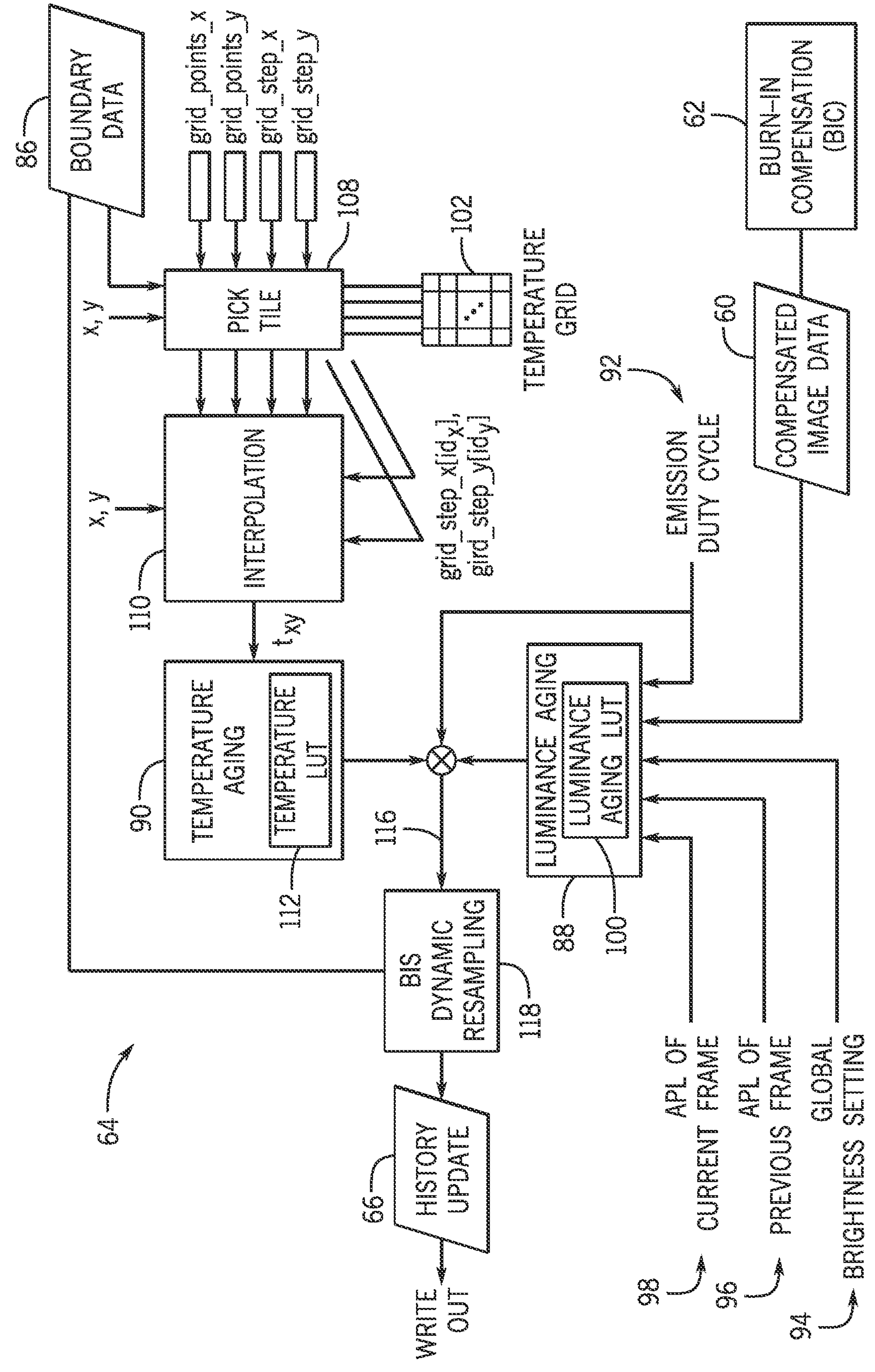
FIG. 10 is a schematic diagram of the BIS collection of FIG. 8, in accordance with an embodiment.

As discussed above with reference to FIG. 8, the BIC/BIS block 52 of the image processing circuitry may perform BIS collection 64 to generate the gain maps 74. To help further illustrate, FIG. 10 is a schematic diagram of BIS collection 64 for writing out a history update 66 to the burn-in history map 70 based on boundary data 86. The estimated amount of burn-in may be a combination of luminance based aging 88 and temperature based aging 90. As such, BIS collection 64 may determine a history update 66 based on the compensated image data 60 sent to the electronic display 12 the temperature of the electronic display 12, such as measured by a temperature grid discussed below. In some embodiments, the compensated image data 60 may already be in the multi-resolution format of a foveated display 76 and, therefore, the luminance based aging 88 may be computed based on the compensated image data 60 (e.g., pixel gray levels) and one or more parameters such as the emission duty cycle 92, the global brightness setting 94, an average pixel luminance of the previous image frame 96, the average pixel luminance of the current image frame 98, and/or any other suitable parameter.

For example, the impact of the pixel gray level may be determined based on the agglomeration of the emission duty cycle 92, the global brightness setting 94 of the display, the compensated image data 60 per color component, and/or one or more reference brightnesses. In one embodiment, the impact of the pixel gray level may be determined by scaling the compensated image data 60 by the global brightness normalized by a reference brightness and/or the inverse of the emission duty cycle 92. Furthermore, the impact of the pixel gray level may include an exponential factor that may vary per color component. As should be appreciated, the reference brightness, may be fixed or floating and, furthermore, may be based on the luminance output of the pixels. In one embodiment, the reference brightness may change between frames based on the emission duty cycle 92 and the global brightness setting 94.

As should be appreciated, the emission duty cycle 92 may be indicative of pulse-width modulation of current to the pixel to obtain a desired brightness. For example, above a threshold brightness, the brightness of the pixel may be adjusted by a voltage supplied to the pixel. However, below a threshold brightness, the voltage may be held constant, and the emission pulse-width modulated at a particular duty cycle to obtain luminance levels below the threshold brightness. Additionally or alternatively, the emission duty cycle 92 may be indicative of how long the pixels are active relative to the length of the image frame. Additionally, the global brightness setting 94 may be indicative of a maximum total brightness for the electronic display 12 at a given time. For example, the global brightness setting 94 may be based on a user setting, ambient lighting, and/or an operating mode of the electronic device 10.

Furthermore, in some embodiments, the impact of the average pixel luminance may be determined based on the agglomeration of the emission duty cycle 92, the global brightness setting 94, the compensated image data 60 per color component, a parameter characterizing the infrared (IR) drop of the display panel 40, the average pixel luminance of the current image frame 98, the average pixel luminance of the previous image frame 96, and/or a reference average pixel luminance (APL). In some embodiments, it may be desirable to use the average pixel luminance of the previous frame, for example due to timings between computations. However, as should be appreciated, the APL of the current frame may also be used in computing the impact of the average pixel luminance on pixel aging.

In some embodiments, the net luminance burn-in impact may be the product or addition of the impact of the pixel gray level and the impact of the average pixel luminance. As such, the net luminance burn-in impact may be based on the compensated image data 60, the global brightness setting 94 of the electronic display 12, the emission duty cycle 92 of the pixels, the average pixel luminance of the current image frame 98, and/or the average pixel luminance of a previous image frame 96. Furthermore, the net luminance burn-in impact may be used to determine the overall luminance based aging 88. For example, in some embodiments, the net luminance burn-in impact may be fed into a luminance aging lookup table (LUT) 100. The luminance aging LUT 100 may be independent per color component and, as such, indexed by color component. Furthermore, any suitable interpolation between the entries of the luminance aging LUT 100 may be used, such as linear or bilinear interpolation. The luminance aging LUT 100 may output the overall luminance based aging 88, which may be taken into account with the overall temperature based aging to generate the history update 66.

Figure 11:
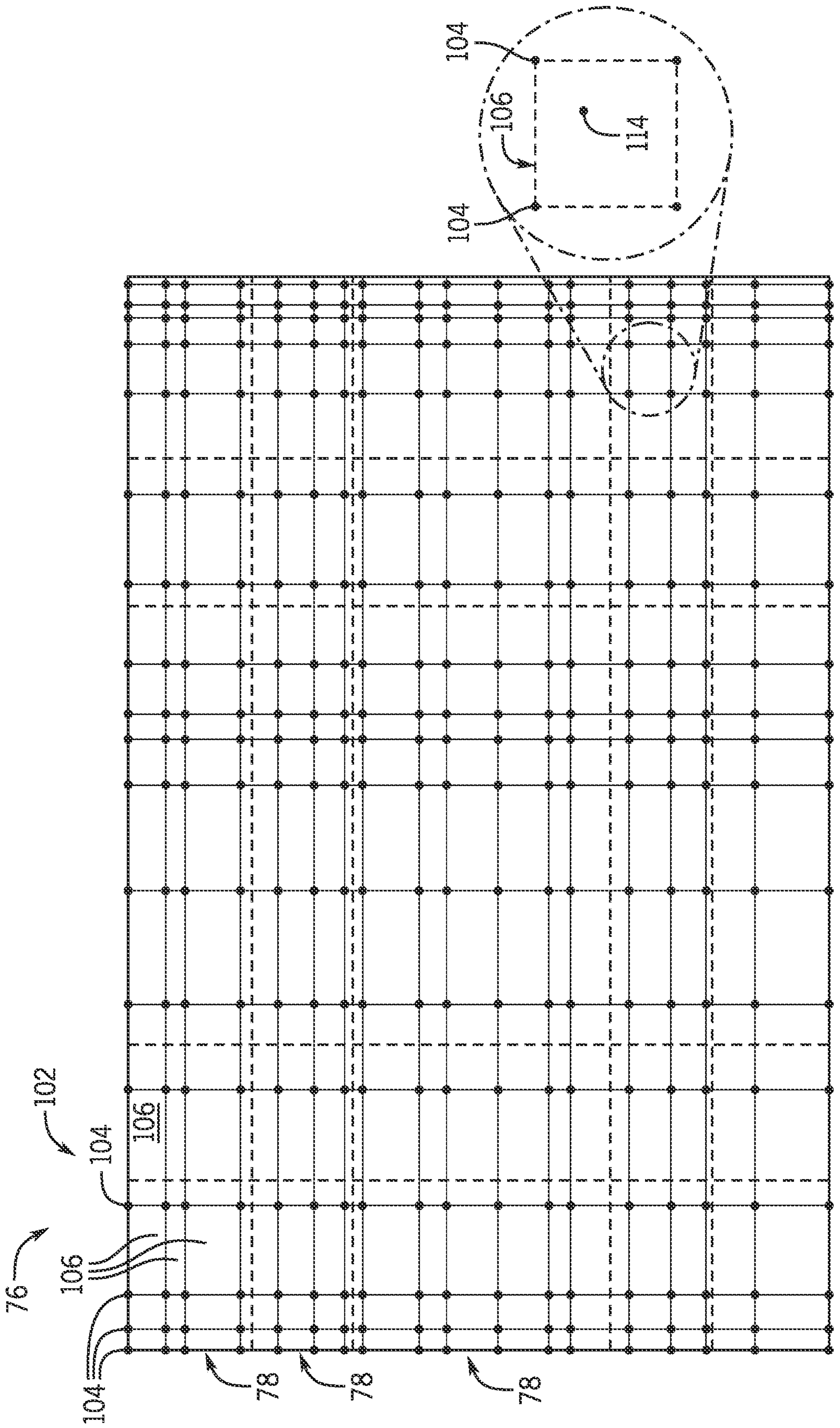
FIG. 11 is an example layout of a temperature grid with grid points disposed on a foveated display having an example set of adjustable regions, in accordance with an embodiment.

In some embodiments, a global temperature may be used to define the temperature of the display pixels. However, the temperature may vary across the display panel 40 and, as such, local temperatures may be determined to more accurately estimate the temperature based aging 90. To determine the local temperatures of the pixels, a temperature grid 102 of multiple grid points 104 may be used, as shown in FIG. 11. Temperatures may be defined at grid points 104 (e.g., via temperature sensors and/or interpolations) that are disposed across the display panel 40. Additionally, tiles 106 may be defined as rectangular areas with grid points 104 at each corner. Returning to FIG. 10, a pick tile block 108 may select a particular tile 106 of the temperature grid 102 from the (x, y) coordinates of the currently selected pixel. The pick tile block 108 may also use grid points in the x dimension (grid_points_x), grid points in the y dimension (grid_points_y), grid point steps in the x direction (grid_step_x), and grid point steps in the y direction (grid_step_y). Two independent multi-entry 1D vectors (one for each dimension), grid_points_x and grid_points_y, are described in this disclosure to represent the grid points 104. In the example of FIG. 11, there are eighteen grid points 104 in each dimension. However, any suitable number of grid points 104 may be used.

As discussed above, while the luminance based aging 88 may be based on the compensated image data 60 already in the multi-resolution format, the temperature grid 102 may be relative to the native pixel resolution of the electronic display 12. As such, boundary data 86 indicative of the boundaries 84 of the adjustable regions 78 and/or the offsets associated therewith, discussed above, may be taken into account to select the correct tile 106 in accordance with the anchor pixel of the pixel grouping 80. As such, the local temperatures are determined for anchor pixels of the pixel groupings 80, and the temperature based aging 90 is output in the multi-resolution format similar to the luminance based aging 88. In other words, the boundary data 86 may be used to skip pixel locations that are non-anchor pixels, such that a single temperature may be obtained for the pixel grouping 80 without processing temperatures of each pixel. Based on the location of the pixel of interest, the four temperatures of the four grid points 104 of the selected tile 106 may be interpolated 110 to determine the pixel temperature value $t_{xy}$, which takes into account the (x, y) coordinates of the pixel of interest and values of a grid step increment in the x dimension (grid_step_x[$id_x$]) and a grid step increment in the y dimension (grid_step_y[$id_y$]). The pixel temperature value $t_{xy}$ may be used to determine the temperature based aging 90, which indicates an amount of aging of the current pixel is likely to have occurred as a result of the current temperature of the current pixel. Additionally, in some embodiments, the current pixel temperature value $t_{xy}$ may be fed into a temperature lookup table (LUT) 112 to obtain the temperature based aging 90.

As should be appreciated, FIG. 11 is an example temperature grid 102 disposed on a foveated display 76 with an example set of adjustable regions 78. Additionally, the temperature grid 102 may have uneven distributions of grid points 104, allowing for higher resolution in areas of the electronic display 12 that are expected to have greater temperature variation (e.g., due to a larger number of distinct electronic components behind the electronic display 12 that could independently emit heat at different times due to variable use). Furthermore, the non-uniformly spaced grid points 104 may accommodate finer resolution temperatures at various positions. For example, the interpolation 110 of $t_{xy}$ at a pixel 114 may take place according to bilinear interpolation, nearest-neighbor interpolation, or any other suitable form of interpolation based on the grid points 104 of the tile 106. However, smaller tiles 106 may lead to improved interpolations 110.

Returning once again to FIG. 10, the temperature based aging 90 and the luminance based aging 88 may be combined to generate an estimated amount of aging 116 for the history update 66. In some embodiments, the combination may be augmented by the emission duty cycle 92 to account for how long the pixels were activated (e.g., relative to the length of the image frame). As discussed above, the temperature based aging 90 and the luminance based aging 88, and therefore the estimated amount of aging 116, are in a multi-resolution format that includes different content resolutions according to the adjustable regions 78. However, while the adjustable regions 78 may change per image frame, the burn-in history map 70 may be maintained at a single resolution. In some embodiments, the burn-in history map 70 may be downsampled relative to the pixel resolution of the display panel 40. Downsampling may help increase efficiency by reducing usage of resources (e.g., processor bandwidth, memory, etc.) involved in storing and/or utilizing the burn-in history map 70. In some embodiments, the burn-in history map 70 may be downsampled by a factor of two in the vertical direction and the horizontal direction, relative to the pixel resolution of the display panel 40.

As the estimated amount of aging 116 is in a multi-resolution format, different portions thereof may be resampled differently, via BIS dynamic resampling 118, based on the boundary data 86. For example, the estimated amount of aging 116 may be upsampled in the vertical direction for pixel locations in the T4 row of adjustable regions 78, and the estimated amount of aging 116 may be downsampled in the vertical direction for pixel locations in the M row of adjustable regions 78, such that the history update 66 is output in a common resolution in the vertical direction across all rows of adjustable regions 78. Furthermore, no scaling is needed for rows T2 and B2 in the vertical direction, as B2 and T2 are already subsampled by a factor of two in the vertical direction relative to the pixel resolution of the display panel 40. Similar BIS dynamic resampling 118 may occur in the horizontal direction. To help illustrate, Table 1 illustrates the vertical resampling for each row of adjustable regions 78, and Table 2 illustrates the horizontal resampling for each column of adjustable regions 78.

TABLE 1

| Row | T4 | T2 | M | B2 | B4 |
|---|---|---|---|---|---|
| Vertical Pixel Grouping | 4x | 2x | 1x | 2x | 4x |
| Vertical Resampling | Upsampling | None | Downsampling | None | Upsampling |
| Resampling Method | Replicate | N/A | Average | N/A | Replicate |

TABLE 2

| Column | L4 | L2 | C | R2 | R4 |
|---|---|---|---|---|---|
| Horizontal Pixel Grouping | 4x | 2x | 1x | 2x | 4x |
| Horizontal Resampling | Upsampling | None | Downsampling | None | Upsampling |
| Resampling Method | Replicate | N/A | Average | N/A | Replicate |

As shown in the tables above, the BIS dynamic resampling 118 may provide for different amounts of scaling in the horizontal and/or vertical directions depending on the adjustable region 78. Furthermore, upsampling may include replicating the values estimated amount of aging 116, as all pixels within the pixel grouping 80 receive the same image data and are proximate enough such that the difference in burn-in is negligible. Furthermore, downsampling may utilize a simple average of the estimated amount of aging 116. As should be appreciated, the resolution of the burn-in history map 70 is given as an example, and other resolutions may be utilized while performing the techniques disclosed herein. For example, if the burn-in history map 70 is maintained at a downsampled resolution by a factor of four in each of the horizontal and vertical directions, the estimated amount of aging 116 for rows T4 and B4 may not be resampled in the vertical direction, and rows T2 and M may both be downsampled by factors of two and four, respectively. As should be appreciated, vertical and horizontal, as used herein, are relative to a scan order of image data and/or the pixels of the electronic display 12 and may change based on implementation. Furthermore, resampling of the vertical and horizontal directions may occur linearly (e.g., one after the other) or simultaneously via a combined scaling taking into account the vertical and horizontal resamplings.

After the BIS dynamic resampling 118 the history update 66 may be in a common resolution throughout, and may be written out to be aggregated with the burn-in history map 70. In some embodiments, the history update 66 may be written out as three independent planes (e.g., one for each color component) with the base addresses for each plane being byte aligned (e.g., 128-byte aligned). Furthermore, in some embodiments, the history update 66 may be determined for each image frame of input image data 58 sent to the display panel 40. However, it may not be practical to sample at each image frame. For example, resources such as electrical power, processing bandwidth, and/or memory allotment may vary depending on the electronic display 12. As such, in some embodiments, the history update 66 may be determined periodically in time or by image frame. For example, the history update 66 may be determined at a rate of 1 Hz, 10 Hz, 60 Hz, 120 Hz, and so on. Additionally or alternatively, the history update 66 may be determined once every other frame, every $10^{th}$ frame, every $60^{th}$ frame, every $120^{th}$ frame, and so on, or may be selectable, such as once every Nth image frame. Furthermore, the write out rate of the history update 66 may be dependent upon the refresh rate of the electronic display 12, which may also vary depending on the source image data 48, the electronic display 12, or an operating mode of the electronic device 10. As such, the write out rate of the history update 66 may be determined based on the bandwidth of the electronic device 10 or the electronic display 12, and may be reduced to accommodate the available processing bandwidth.

Figure 12:
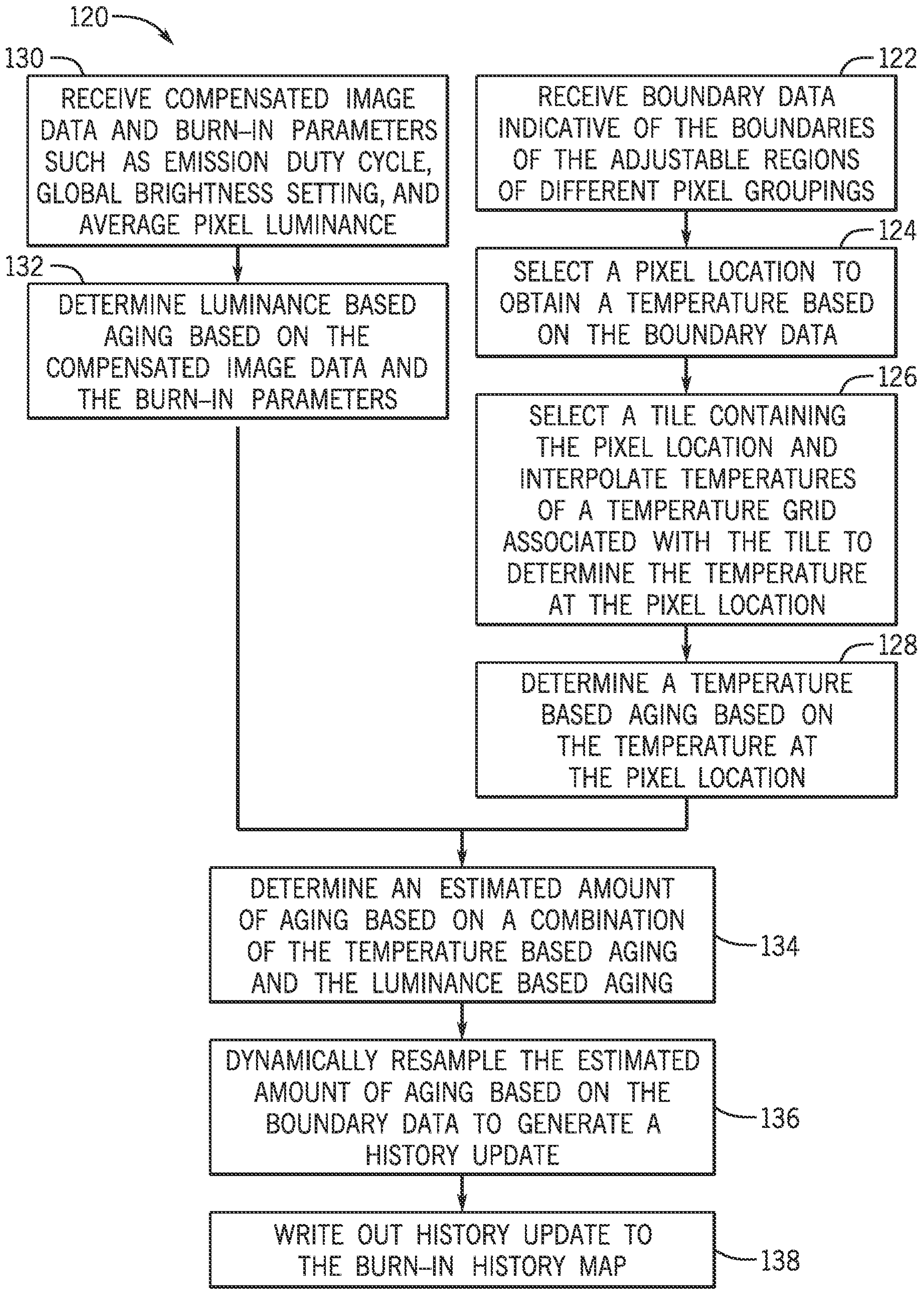
FIG. 12 is a flowchart of an example process for performing BIS collection, in accordance with an embodiment.

FIG. 12 is a flowchart 120 of an example process for performing BIS collection 64. The BIC/BIS block 52 may receive boundary data 86 indicative of the boundary locations between adjustable regions 78 of different pixel groupings 80 and/or offsets related thereto (process block 122). Pixel locations where temperatures are to be obtained are selected based on the boundary data 86 (process block 124). Additionally, a tile 106 is selected that contains the pixel location, and the temperature at the pixel location may be interpolated from temperatures of a temperature grid 102 that are associated with the tile 106 (process block 126). Temperature based aging 90 is determined based on the temperature at the pixel location (process block 128). In parallel or in sequence with determining the foregoing steps, the BIC/BIS block 52 may receive compensated image data and burn-in parameters such as the emission duty cycle 92, the global brightness setting 94, and/or an average pixel luminance (e.g., the APL of the current image frame 98 and/or the APL of the previous image frame 96) (process block 130). Additionally, luminance based aging 88 is determined based on the compensated image data and one or more of the burn-in parameters (process block 132). An estimated amount of aging 116 is determined based on a combination of the temperature based aging 90 and the luminance based aging (process block 134), and a history update 66 is generated by BIS dynamic resampling 118 of the estimated amount of aging 116 (process block 136). The history update 66 is then written out to the burn-in history map 70 (process block 138).

Burn-In Compensation (BIC)

Figure 13:
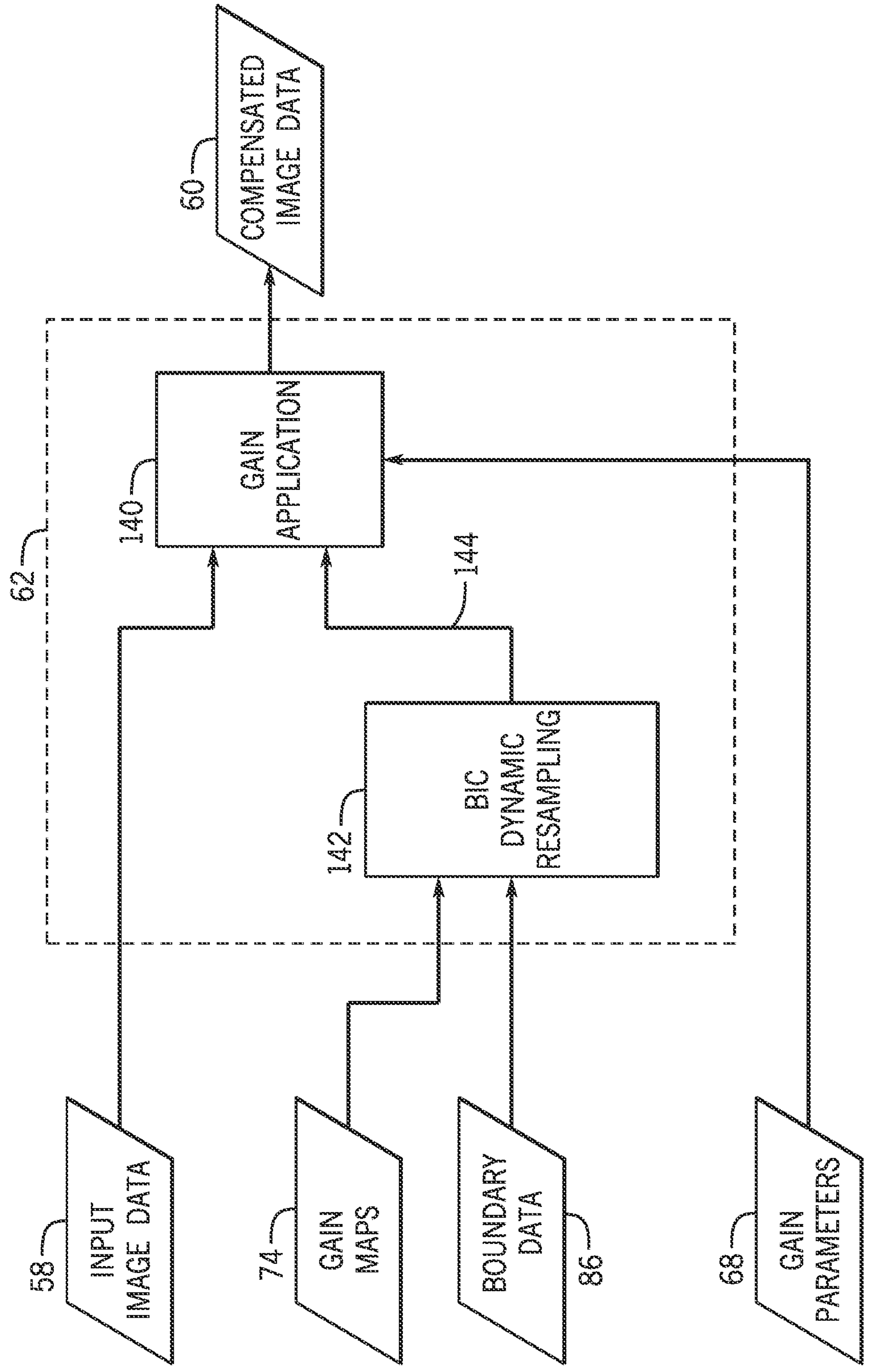
FIG. 13 is a schematic diagram of the BIC of FIG. 8, in accordance with an embodiment.

As discussed above, the history updates 66 are used to maintain the burn-in history map 70, which is used to generate gain maps 74. The gain maps 74 may gain down pixel values that will be sent to the less-aged pixels (which would otherwise be brighter) without gaining down, by gaining down less, or by gaining up the image data that will be sent to the pixels with the greatest amount of aging (which would otherwise be darker). In this way, the pixels of the electronic display 12 that are likely to exhibit the greatest amount of aging will appear to be equally as bright as pixels with less aging. As the burn-in history map 70 and the gain maps 74 are both in static resolutions (i.e., non-changing with the adjustable regions 78), the BIC/BIS block 52 may generate the gain maps 74 based on the burn-in history map 70 without scaling or by using a static scaling if not in the same resolution. As used herein, both the burn-in history map 70 and the gain maps 74 are in the same resolution, downsampled from the pixel resolution of the display panel 40 by a factor of two in both the horizontal and vertical directions. However, as should be appreciated, the resolutions may be set to any suitable resolution, depending on implementation. To utilize the gain maps 74 in gain application 140, the boundary data 86 may be used for BIC dynamic sampling 142 of the gain maps 74, as shown in the schematic diagram of FIG. 13.

The BIC dynamic resampling 142 may, effectively, operate as an inverse of the BIS dynamic resampling 118 to generate multi-resolution gain maps 144 for use in gain application 140 to the input image data 58 in the multi-resolution format. Based on the boundary data 86, portions of the gain maps 74 may be upsampled, downsampled, or used natively. For example, the gain maps 74 may be downsampled in the vertical direction for pixel locations in the T4 row of adjustable regions 78, and the gain maps 74 may be upsampled in the vertical direction for pixel locations in the M row of adjustable regions 78, such that the multi-resolution gain maps 144 match the multi-resolution format of the input image data 58 across all rows of adjustable regions 78. Furthermore, no vertical scaling is needed for rows T2 and B2, as the gain maps 74 may already be subsampled by a factor of two in the vertical direction relative to the pixel resolution of the display panel 40. Similar BIC dynamic resampling 142 may occur in the horizontal direction. To help illustrate, Table 3 illustrates the vertical resampling for each row of adjustable regions 78, and Table 4 illustrates the horizontal resampling for each column of adjustable regions 78.

TABLE 3

| Row | T4 | T2 | M | B2 | B4 |
|---|---|---|---|---|---|
| Vertical Pixel Grouping | 4x | 2x | 1x | 2x | 4x |
| Vertical Resampling | Downsampling | None | Upsampling | None | Donwsampling |

TABLE 4

| Column | L4 | L2 | C | R2 | R4 |
|---|---|---|---|---|---|
| Horizontal Pixel Grouping | 4x | 2x | 1x | 2x | 4x |
| Horizontal Resampling | Downsampling | None | Upsampling | None | Downsampling |

In some embodiments, the gain maps 74 may be fetched by pixel row (e.g., a row of information associated with pixel locations regardless of resolution), and the appropriate BIC dynamic resampling 142 is applied thereto. For example, when fetching a pixel row of a gain map 74 that is associated with pixel locations within the M row of the adjustable regions 78 (e.g., as determined by the boundary data 86), the pixel row of the gain map 74 may be fetched and upsampled by a factor of two in the vertical direction. Furthermore, different portions of the pixel row associated with pixel locations within the M row may be upsampled, downsampled, or left in the native format in the horizontal direction depending on which column of the adjustable regions 78 the pixel locations are associated. Indeed, each fetched pixel row of the gain maps 74 may undergo multiple different resamplings in the horizontal direction according to the boundary data 86. The vertical upsampling for the M row pixel rows may be accomplished by any suitable interpolation such as linear, bilinear, nearest neighbor, or simple replication.

Additionally, for pixel rows of the gain maps 74 associated with the T2 and B2 rows of the adjustable regions 78, no scaling may be needed in the vertical direction, as the native resolution of the gain maps 74 may be the same as in the vertical direction as the input image data 58 in those adjustable regions 78. Moreover, for pixel rows of the gain maps 74 associated with the T4 and B4 rows of the adjustable regions 78, vertical downsampling may be accomplished. In some embodiments, vertical downsampling may include averaging the gain map values of multiple (e.g., two) pixel rows.

Figure 14:
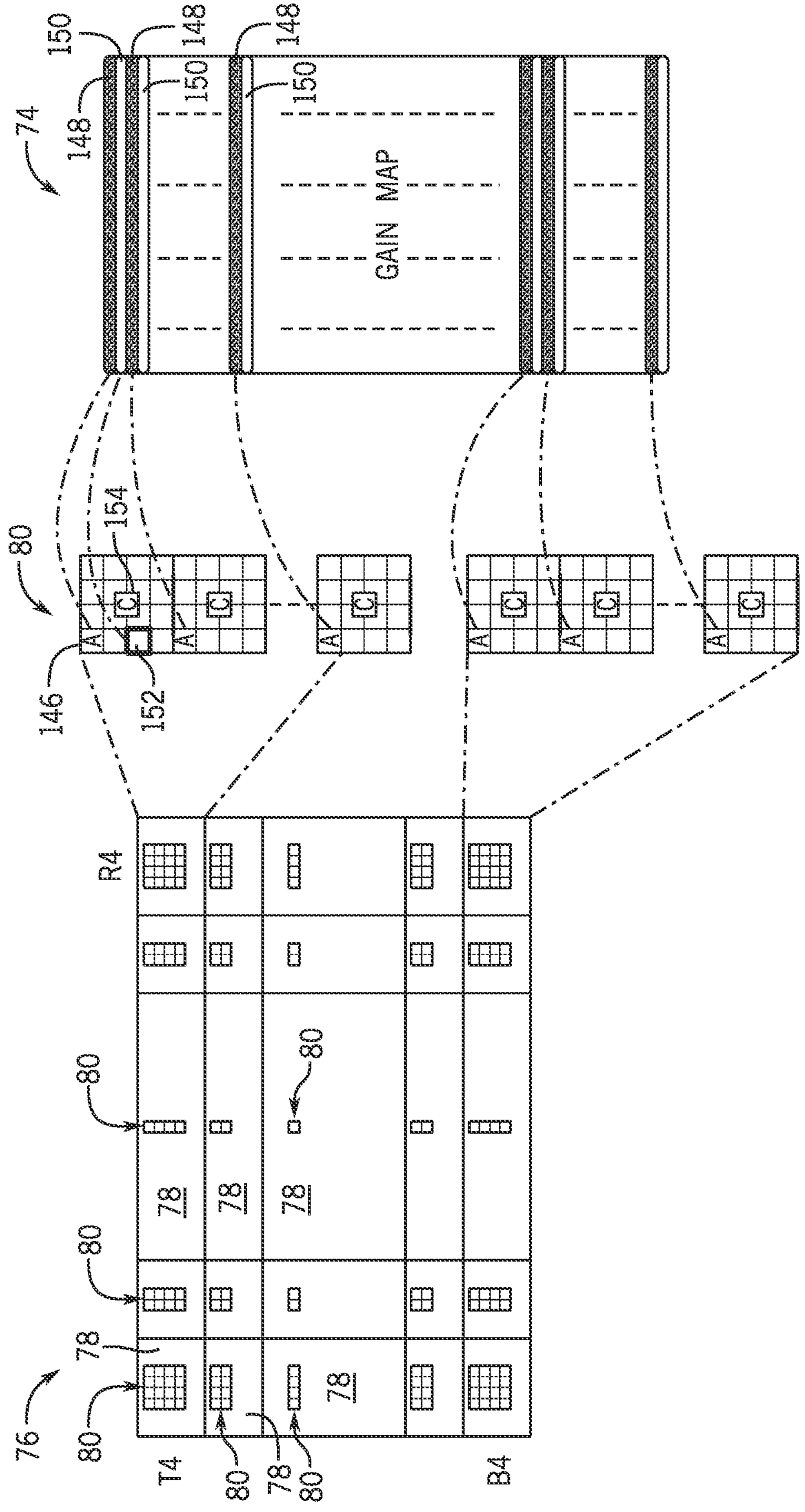
FIG. 14 is an example data fetch of a gain map during dynamic resampling according to an example set of adjustable regions, in accordance with an embodiment.

However, to increase efficiency, in some embodiments, vertical downsampling may be accomplished by using the gain map value of one pixel row and skipping the next pixel row, as illustrated in FIG. 14. As discussed above, each pixel grouping 80 may be represented by an anchor pixel 146. In the example of FIG. 14, the pixel groupings 80 of the T4 and B4 rows of the R4 column of the adjustable regions 78 are depicted as 4×4 pixel groupings 80 with an anchor pixel 146 at the top left of each pixel grouping 80. As the gain map 74 is natively formatted in the vertical direction at twice the resolution of the 4×4 pixel groupings 80, an even pixel row 148 of a gain map 74 may correspond to a pixel location of the anchor pixel 146 of the pixel grouping 80, while an odd pixel row 150 corresponds to an auxiliary pixel 152 of the pixel grouping 80. Since auxiliary pixels 152 receive the same image data as their associated anchor pixels 146, in some embodiments, the odd pixel rows 150 may be skipped during fetching to reduce bandwidth utilization and increase efficiency. As should be appreciated, while discussed herein as odd and even, pixel row numbering may be implementation specific and, as such, even and odd may be reversed in some scenarios. Alternatively, as the auxiliary pixel 152 is closer to a center 154, a nearest neighbor approximation may be used for the downsampling such that the odd pixel rows 150 are fetched instead of the even pixel rows 148. In such a scenario, the gain map values of the odd pixel rows 150 are used for the pixel groupings 80 during gain application 140. Furthermore, in some embodiments, which pixel row is used in downsampling may be selectable based on a register value.

As discussed above, pixel rows may be fetched and BIC dynamic resampling 142 may be applied in the vertical direction according to the associated rows of the adjustable regions 78. Furthermore, each fetched pixel row of the gain maps 74 may undergo multiple different resamplings in the horizontal direction according to the boundary data 86. Horizontal upsampling may be accomplished by any suitable interpolation such as linear, bilinear, nearest neighbor, or simple replication, and horizontal downsampling may be accomplished by averaging or selection of one of a gain map value, such as the value associated with the anchor pixel 146.

As discussed above, the gain maps 74 may undergo BIC dynamic resampling to provide a multi-resolution gain map 144 for gain application 140. As should be appreciated, the pixel gain values of the gain maps 74 may have any suitable format and precision and may be set based on the format and precision of the input image data 58. Gain application 140 may be accomplished by augmenting the gain values of the multi-resolution gain maps 144 with one or more gain parameters 68 and applying (e.g., multiplying) the pixel values of the input image data 58 by the augmented gains. As discussed herein, the gain parameters 68 include a brightness adaptation factor to adjust the gains based on the global brightness setting and a normalization factor to account for the maximum gains across the different color component channels.

The brightness adaptation factor may take any suitable form, and take into account the global brightness setting of the electronic display 12 and/or the emission duty cycle, as the effect of burn-in on a pixel may differ at different emission duty cycles. In some embodiments, the brightness adaptation factor may be determined via a lookup table (LUT) based on the pixel values of the input image data 58 scaled by a function of the global brightness setting and the emission duty cycle. As should be appreciated, the brightness adaptation factor may be obtained via a LUT, by computation, or any suitable method accounting for the global brightness setting of the electronic display 12 and/or the emission duty cycle of the pixel of interest.

Additionally, in some embodiments, the normalization factor may be a function of the brightness adaptation factor and computed on a per-component basis. The normalization factor may compensate for an estimated pixel burn-in of the most burnt-in pixel with respect to the maximum gain of each color component. For example, in some embodiments, the normalization factor may assign a gain of 1.0 to the pixel(s) determined to have the most burn-in and a gain of less than 1.0 to the pixel(s) that are less likely to exhibit burn-in effects. As such, the gain parameters 68 may be used in conjunction with the multi-resolution gain maps 144 to compensate the input image data 58 for burn-in related aging of the display pixels.

Figure 15:
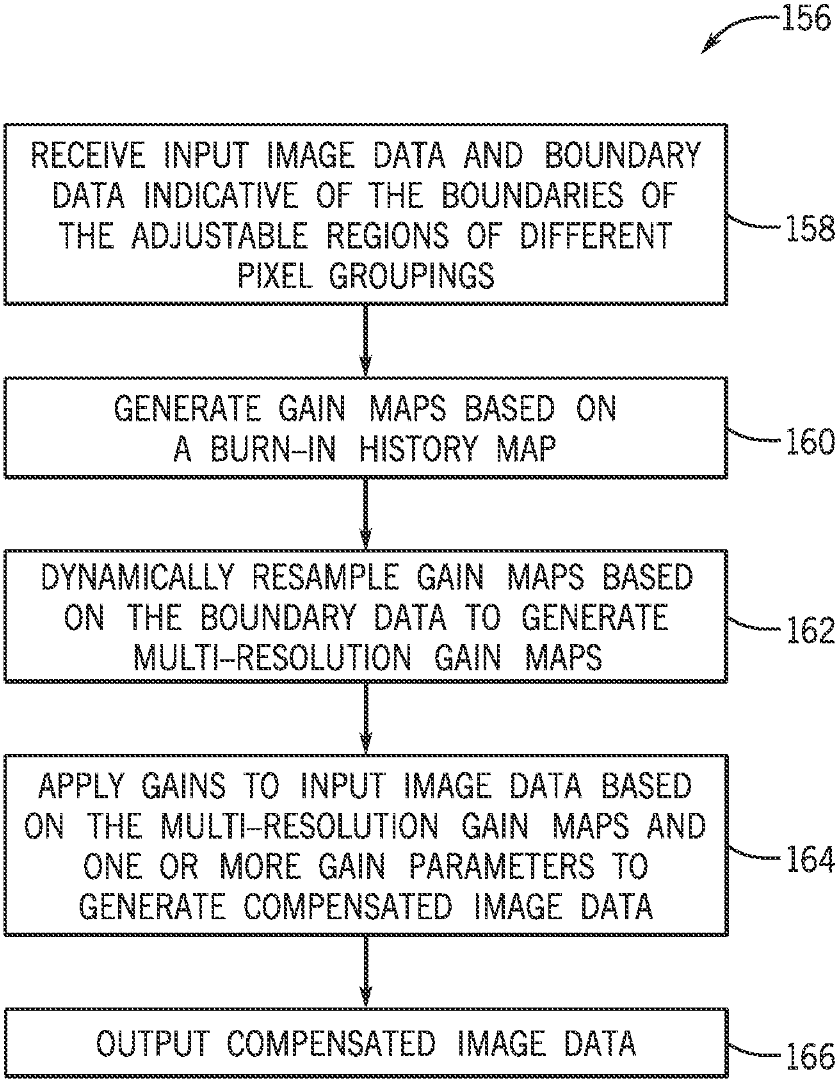
FIG. 15 is a flowchart of an example process for performing BIC, in accordance with an embodiment.

FIG. 15 is a flowchart 156 of an example process for performing BIC 62. The BIC/BIS block 52 may receive input image data 58 and boundary data 86 indicative of the boundary locations between adjustable regions 78 of different pixel groupings 80 and/or offsets related thereto (process block 158). Gain maps 74 may be generated based on a burn-in history map 70 indicative of the cumulative amount of aging of the display panel 40 (process block 160). Additionally, the gain maps 74 may undergo BIC dynamic resampling 142 to generate multi-resolution gain maps 144 based on the boundary data 86 (process block 162). Gains may be applied to the input image data 58 based on the multi-resolution gain maps 144 and one or more gain parameters 68 to generate compensated image data 60 (process block 164), and the compensated image data 60 may be output (process block 166) for additional image processing and/or display on the electronic display 12.

Furthermore, although the flowcharts 120, 156 are shown in a given order, in certain embodiments, process/decision blocks may be reordered, altered, deleted, and/or occur simultaneously. Additionally, the flowcharts 120, 156 are given as illustrative tools and further decision and process blocks may also be added depending on implementation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:

an electronic display configured to display an image frame based on compensated image data, the image frame comprising two or more regions having different resolutions; and image processing circuitry configured to:

resample a gain map having a constant resolution to generate a multi-resolution gain map of gain values having the different resolutions based on a burn-in history of display pixels of the electronic display, wherein generating the multi-resolution gain map comprises resampling a first portion of the gain map corresponding to a first region of the two or more regions by a first factor and resampling a second portion of the gain map corresponding to a second region of the two or more regions by a second factor; and apply the gain values of the multi-resolution gain map to input image data to generate the compensated image data having reduced or eliminated burn-in image artifacts.

2. The electronic device of claim 1, wherein the image processing circuitry is configured to:

determine a constant resolution history update corresponding to the display pixels and due to the image frame based on the compensated image data; and update the burn-in history based on the constant resolution history update.

3. The electronic device of claim 2, wherein the image processing circuitry is configured to determine the constant resolution history update by:

generating a multi-resolution estimation of aging having the different resolutions based on the compensated image data; and dynamically resampling the multi-resolution estimation of aging to generate the constant resolution history update.

4. The electronic device of claim 3, wherein the image processing circuitry is configured to determine the multi-resolution estimation of aging by:

determining a temperature-based aging based on a temperature grid coinciding with the display pixels;

determining a luminance-based aging based on the compensated image data; and combining the temperature-based aging and the luminance-based aging to generate the multi-resolution estimation of aging.

5. The electronic device of claim 3, wherein the image processing circuitry is configured to dynamically resample the multi-resolution estimation based on boundary data indicative of locations of boundaries between the two or more regions.

6. The electronic device of claim 1, wherein the image processing circuitry is configured to dynamically resample the gain map based on boundary data indicative of locations of boundaries between the two or more regions.

7. The electronic device of claim 1, wherein the image processing circuitry is configured to resample the first portion of the gain map by downsampling the first portion of the gain map from the constant resolution to a first resolution of the different resolutions.

8. The electronic device of claim 7, wherein the image processing circuitry is configured to resample the second portion of the gain map by upsampling the second portion of the gain map from the constant resolution to a second resolution of the different resolutions.

9. The electronic device of claim 1, wherein the image processing circuitry is configured to resample the first portion of the gain map by downsampling the first portion of the gain map in a first direction and upsampling the first portion of the gain map in a second direction.

10. The electronic device of claim 1, wherein the electronic display comprises a foveated display, wherein the two or more regions comprise two or more adjustable regions, wherein sizes and positions of the two or more adjustable regions, relative to a display panel of the electronic display, are set for the image frame based on a focal point of a viewer's gaze relative to the display panel.

11. An electronic device comprising:

an electronic display configured to display an image frame based on compensated image data, the image frame comprising two or more regions having different resolutions; and image processing circuitry configured to:

determine a gain map based on a burn-in history of display pixels of the electronic display;

apply the gain map to input image data to generate the compensated image data;

generate a multi-resolution estimation of pixel aging due to the image frame based on the compensated image data, the multi-resolution estimation of pixel aging having the different resolutions;

dynamically resample the multi-resolution estimation of pixel aging to generate a constant resolution history update corresponding to the display pixels; and update the burn-in history based on the constant resolution history update.

12. The electronic device of claim 11, wherein the gain map comprises a multi-resolution gain map having the different resolutions.

13. The electronic device of claim 12, wherein the image processing circuitry is configured to determine the multi-resolution gain map by:

determining a constant resolution gain map for the image frame based on the burn-in history; and dynamically resampling the constant resolution gain map from a constant resolution format to a multi-resolution format comprising the different resolutions.

14. The electronic device of claim 11, wherein the image processing circuitry is configured to determine the multi-resolution estimation of pixel aging by:

determining a temperature-based aging based on boundary data and a temperature grid coinciding with the display pixels, wherein the boundary data is indicative of locations of boundaries between the two or more regions;

determining a luminance-based aging based on the compensated image data; and combining the temperature-based aging and the luminance-based aging to generate the multi-resolution estimation of pixel aging.

15. The electronic device of claim 14, wherein the image processing circuitry is configured to determine the temperature-based aging by:

selecting pixel positions of the electronic display based on the boundary data, wherein selecting the pixel positions comprises selecting anchor pixel positions of pixel groupings of the two or more regions;

determining temperatures at the pixel positions based on the temperature grid; and determining the temperature-based aging based on the temperatures.

16. The electronic device of claim 11, wherein the image processing circuitry comprises a hardware pipeline having dedicated burn-in compensation and statistics collection circuitry configured to apply the gain map to the input image data and update the burn-in history based on the constant resolution history update.

17. A non-transitory, machine-readable medium comprising instructions that, when executed by one or more processors, cause the one or more processors to control operations of image processing circuitry or to perform the operations, the operations comprising:

determining a multi-resolution gain map of gain values for an image frame based on a burn-in history of display pixels of an electronic display, the image frame comprising two or more regions having different resolutions, and the multi-resolution gain map comprising the different resolutions;

applying the gain values of the multi-resolution gain map to input image data to generate compensated image data;

determining a multi-resolution estimation of pixel aging due to the image frame based on the compensated image data, the multi-resolution estimation of pixel aging having the different resolutions;

dynamically resampling the multi-resolution estimation of pixel aging to generate a constant resolution history update corresponding to the display pixels; and updating the burn-in history based on the constant resolution history update.

18. The non-transitory, machine-readable medium of claim 17, wherein determining the multi-resolution gain map comprises:

determining a gain map having a constant resolution for the image frame based on the burn-in history; and dynamically resampling the gain map to generate the multi-resolution gain map based on boundary data indicative of locations of boundaries between the two or more regions.

19. The non-transitory, machine-readable medium of claim 18, wherein the electronic display comprises a foveated display, and wherein the operations comprise:

setting the locations of the boundaries of the two or more regions based on a focal point of a viewer's gaze; and generating the boundary data according to the locations of the boundaries.

* * * * *